United States Patent
Bozzi et al.

(10) Patent No.: US 8,881,532 B2
(45) Date of Patent: Nov. 11, 2014

(54) CONTROL METHOD FOR COOLING A TURBINE STAGE IN A GAS TURBINE

(75) Inventors: Luca Bozzi, Genoa (IT); Marco Mantero, Genoa (IT); Federico Bonzani, Genoa (IT)

(73) Assignee: Ansaldo Energia S.p.A., Genoa (IT)

( * ) Notice: Subject to any disclaimer, the term of this patent is extended or adjusted under 35 U.S.C. 154(b) by 501 days.

(21) Appl. No.: 13/253,316

(22) Filed: Oct. 5, 2011

(65) Prior Publication Data
US 2012/0111020 A1 May 10, 2012

(30) Foreign Application Priority Data
Oct. 6, 2010 (IT) .............................. TO2010A0824

(51) Int. Cl.
F02C 6/08 (2006.01)
F02C 7/12 (2006.01)
F02C 7/18 (2006.01)
F02C 9/18 (2006.01)

(52) U.S. Cl.
CPC ............. *F02C 9/18* (2013.01); *F05D 2260/205* (2013.01); *F05D 2270/3013* (2013.01); *F02C 7/18* (2013.01); *F05D 2270/3011* (2013.01); *F05D 2270/303* (2013.01); *F05D 2270/082* (2013.01); *F05D 2270/08* (2013.01)
USPC ............................................ 60/782; 60/806

(58) Field of Classification Search
CPC ............... F02C 7/18; F02C 6/08; F02C 9/18; Y02T 50/676; F01D 11/24
USPC .................................... 60/782, 785, 795, 806
See application file for complete search history.

(56) References Cited

U.S. PATENT DOCUMENTS

| | | | |
|---|---|---|---|
| 6,098,395 A * | 8/2000 | North | 60/782 |
| 6,615,574 B1 * | 9/2003 | Marks | 60/772 |
| 6,779,346 B2 * | 8/2004 | Nichols et al. | 60/782 |
| 7,536,864 B2 * | 5/2009 | Wolfe et al. | 60/782 |
| 7,536,865 B2 * | 5/2009 | Mikhail | 60/795 |
| 2001/0018824 A1 * | 9/2001 | Leone et al. | 60/39.02 |
| 2003/0046938 A1 * | 3/2003 | Mortzheim et al. | 60/782 |
| 2009/0266082 A1 * | 10/2009 | O'Leary | 60/785 |
| 2010/0242491 A1 * | 9/2010 | Davis et al. | 60/782 |
| 2010/0286889 A1 * | 11/2010 | Childers | 701/100 |
| 2012/0117977 A1 * | 5/2012 | Childers et al. | 60/782 |

FOREIGN PATENT DOCUMENTS

| | | |
|---|---|---|
| EP | 1120559 | 8/2001 |
| EP | 1084327 | 11/2003 |
| EP | 2119892 | 11/2009 |

* cited by examiner

*Primary Examiner* — Gerald L Sung
(74) *Attorney, Agent, or Firm* — Greenblum & Bernstein, P.L.C.

(57) ABSTRACT

A control method for cooling a turbine stage of a gas turbine, whereby cooling air is bled from combustion air flowing in a compressor of the gas turbine, and is fed to a cooling circuit staring from a stator of the turbine stage; and cooling airflow is adjusted as a function of the pressure at the inlet of the cooling circuit, and as a function of the combustion air pressure at the exhaust of the compressor; more specifically, there is a feedback control setting a setpoint, which is predetermined as a function of the power output of the turbine to reduce contaminating emissions.

20 Claims, 5 Drawing Sheets

CONTROL METHOD FOR COOLING A TURBINE STAGE IN A GAS TURBINE

The present invention relates to a control method for cooling a turbine stage in a gas turbine, as defined in the preamble of Claim 1.

BACKGROUND OF THE INVENTION

EP1084327 describes a control method for feeding cooling air from a compressor to the stator and rotor blades of a given turbine stage. The cooling air flows through the stator blades and the stator inner ring into the rotor of the same stage, and finally through the rotor blades. A valve for regulating cooling airflow upstream from the stator is operated by a control unit, which operates on the basis of a feedback signal from a pressure sensor at the valve outlet, and, in the control method described, adjusts cooling airflow to maintain a predetermined pressure signal from the sensor.

This control strategy has the drawback of apparently not taking into account the power output or turbine load, and of failing to accurately adjust cooling air consumption. For example, in the event of excessive cooling air consumption, at high loads the reduction in combustion airflow could increase temperature in the combustion chamber and therefore nitric oxide emissions.

Conversely, an excessive reduction in cooling air consumption at low loads could cause a temperature drop in the combustion chamber and therefore an increase in carbon monoxide emissions and particulate.

SUMMARY OF THE INVENTION

It is an object of the present invention to provide a control method for cooling a turbine stage in a gas turbine, designed to provide a simple, low-cost solution to the above drawbacks, and, in particular, to optimize cooling airflow in different operating conditions.

According to the present invention, there is provided a control method for cooling a turbine stage in a gas turbine, as claimed in Claim 1.

The control method according to the invention provides for optimizing cooling air consumption, improving efficiency and increasing power at high loads, and reducing emissions at low loads.

The control method according to the invention also ensures the minimum amount of cooling air necessary to protect the thermally stressed parts of the turbine, even when the consumption curve of some of the blades fails to conform with design specifications. It is important to bear in mind that the air consumption curve varies the longer the blade is operated, due to degradation of the blade. The proposed control method implements strategies capable of also taking this into account by maintaining a strict minimum amount of secondary air at high loads.

The control method proposed can also be upgraded, with no structural alterations to the secondary-air circuits, by simply altering the control logic.

Finally, unlike Patent EP1084327, the strategy devised provides for controlling the operating temperature of turbine components such as the rotor and stator blades, and, by preventing overheating, ensures greater reliability and a longer working life of thermally stressed parts (such as the stator and rotor blades).

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
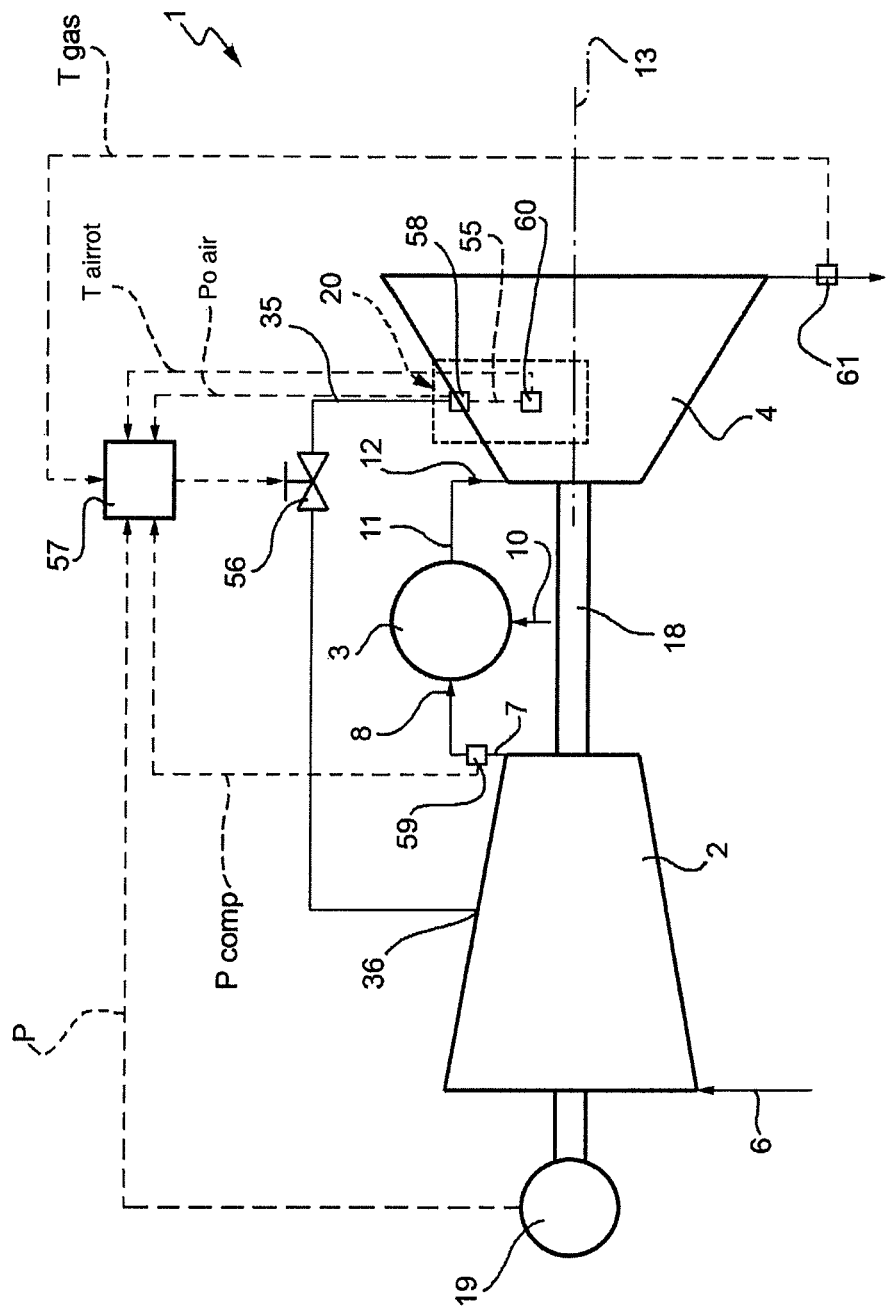
FIG. 1 shows a schematic of a gas turbine implementing a preferred embodiment of the turbine stage cooling control method according to the present invention.

Number 1 in FIG. 1 indicates a gas turbine (shown schematically) comprising a compressor 2, a burner 3, and a high-pressure turbine 4. Compressor 2 is fed with air through an inlet 6, and has an outlet 7 connected to the inlet 8 of burner 3, which is fueled by a line 10 and has an outlet 11 connected to the inlet 12 of turbine 4.

Figure 2:
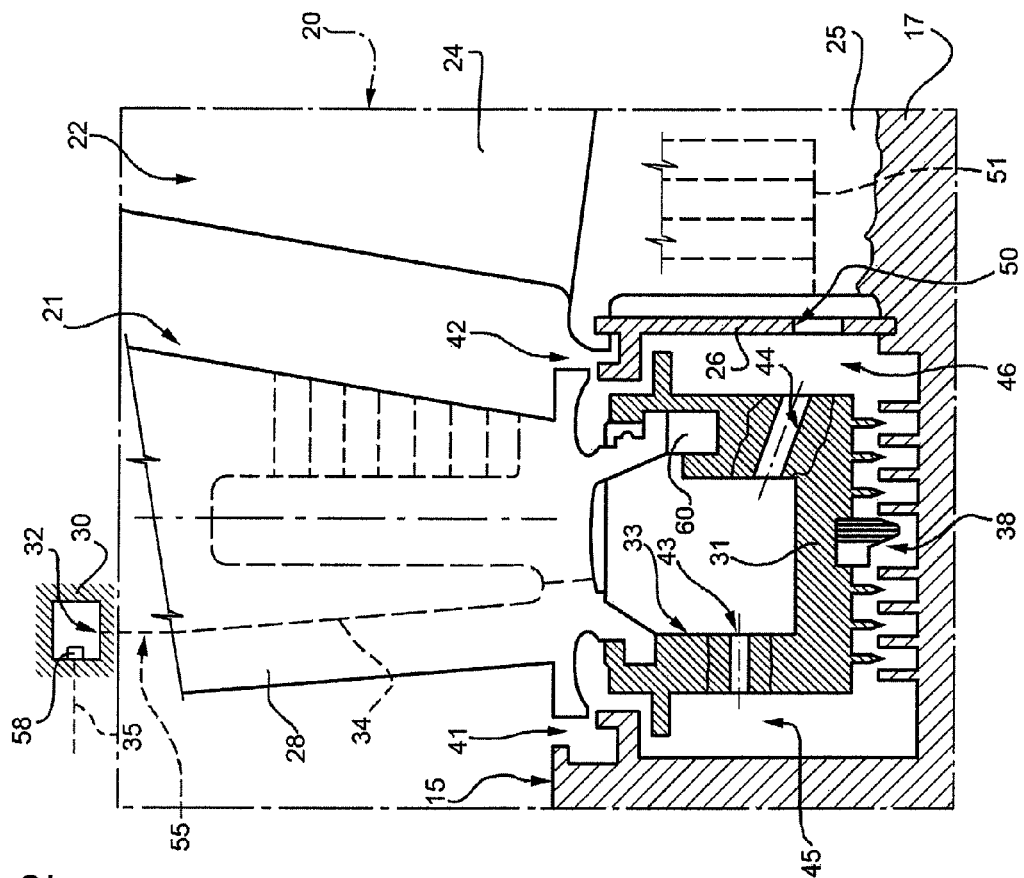
FIG. 2 shows a partial, partly sectioned detail of the turbine stage cooled using the control method according to the present invention.

With reference to FIG. 2, turbine 4 extends along an axis 13 (FIG. 1), and has an annular conduit 15 (shown partly) defined externally by a fixed annular structure, and internally by a hub 17 fitted to a rotary shaft 18 (FIG. 1) powering compressor 2 and normally also an alternator 19. The burnt gases in conduit 15 encounter a number of successive stages 20, only one of which is shown partly. For the sake of simplicity, the following description refers to this one stage 20, it being understood that the same also applies to all the others.

Stage 20 comprises a stator 21 and a rotor 22. Rotor 22 comprises an array of blades 24, the inner radial ends of which are fixed to an outer annular portion 25 of hub 17 by an anchor protected by an annular plate 26 extending crosswise to axis 13.

Stator 21 comprises an array of blades 28, the ends of which are fixed, outwardly, to a portion 30 (shown schematically) of the fixed annular structure and, inwardly, to a ring 31 axially facing plate 26.

Portion 30 and ring 31 define respective annular conduits 32, 33, which communicate via channels 34 (shown schematically) formed in blades 28. Conduit 32 is fed with pressurized air by a line 35 (shown schematically) connected to a bleeding point 36 (FIG. 1) in an intermediate stage of compressor 2, so the pressure of the air from bleeding point 36 is lower than the combustion air pressure $P_{comp}$ at the exhaust of compressor 2. The bled air from line 35 is used to cool stator 21, and preferably also rotor 22, and as sealing air; and the air for cooling stages 20 is supplied by respective lines (not shown) at different pressures.

The inner radial end of ring 31 is fitted to hub 17 by a seal 38 preferably comprising a labyrinth seal and a brush seal. Along ring 31, the axial ends of stator 21 are connected to hub 17 on one side, and to plate 26 on the other side, by respective labyrinth seals 41, 42. For each blade 28, ring 31 has a set of holes 43 connecting conduit 33 to an annular cavity 45 between seals 38 and 41; and a set of holes 44 opposite to holes 43 and connecting conduit 33 to an annular cavity 46 between seals 38 and 42. More specifically, holes 44 face plate 26, and slope to impart a swirl component to the airflow to maximize pressure and minimize the total relative temperature of the airflow towards rotor blade 24.

The air in cavity 45 flows through seal 41 to perform a sealing function; and the air in cavity 46 flows partly through seal 42 to perform a sealing function, and partly through a number of holes 50 in plate 26 into channels 51 (shown schematically) formed in portion 25 and blades 24 to cool rotor 22.

Conduits 32, 33, channels 34, 51, cavities 45, 46, and holes 43, 44, 50 form part of a cooling circuit 55, which starts from the outlet of line 35 and ends into conduit 15, through seals 41, 42 and the outlets of channels 34, 51 made in blades 24, 28. Cooling airflow in circuit 55 is adjusted by a valve 56 located along line 35 or in portion 30, and controlled by an electronic control unit 57.

The control strategy implemented by unit 57 adjusts the opening of valve 56 on the basis of the following parameters:

the cooling air pressure $P_{Oair}$ measured by a sensor 58 (shown schematically) at the inlet of circuit 55;

the combustion air pressure $P_{comp}$ measured by a sensor 59 (shown schematically) at the exhaust of compressor 2;

the cooling air temperature $T_{airrot}$ measured by a sensor 60 (shown schematically) at the outlet of stator 21 or the inlet of rotor 22;

the load or power output P of turbine 4 read on terminals of alternator 19;

the exhaust gas temperature $T_{gas}$ of turbine 4, measured by a sensor 61 (shown schematically).

More specifically, pressure $P_{Oair}$ is measured in conduit 32, and temperature $T_{airrot}$ in conduit 33 or cavity 46.

Other quantities measured to control operation of gas turbine 1 are:

air temperature at the exhaust of compressor 2;

cooling air temperature $T_{air}$ at the inlet of circuit 55 of stage 20, i.e. along conduit 32, to calculate heating of the cooling air across blades 28 ($T_{air}-T_{airrot}$);

cooling air pressure at the outlet of stator 21, i.e. along conduit 33, to calculate the pressure drop across blades 28;

ambient pressure and temperature;

gas pressure at outlet 11 of burner 3, to calculate the pressure drop $\Delta p_{cc}$ between inlet 8 and outlet 11 of burner 3.

According to one aspect of the invention, the opening of valve 56 is adjusted as a function of the ratio between pressure $P_{Oair}$, measured by sensor 58, and pressure $P_{comp}$ to achieve a given expansion ratio β in circuit 55, and therefore a given cooling air mass flow.

Expansion ratio β equals the ratio between pressure $P_{Oair}$ and the cooling air exhaust pressure of circuit 55, i.e. the pressure $P_{gas}$ of the burnt gases in conduit 15 of the cooled stage 20 considered; and pressure $P_{gas}$ in turn is roughly proportional, by a quantity (const), to the pressure $P_{Tin}$ of the burnt gases at inlet 12. Assuming the expansion curve of the turbine remains unchanged alongside variations in load, quantity (const) depends on the fall in gas pressure along conduit 15, and so varies according to the stage considered, but, for each cooled stage, may be assumed roughly constant alongside variations in load P of turbine 4.

Pressure $P_{Tin}$, in turn, roughly equals the difference between pressure $P_{comp}$ and the pressure losses $\Delta p_{cc}$ in the combustion chamber of burner 3:

$$P_{gas}=const*P_{Tin}=const*(P_{comp}-\Delta p_{cc})$$

The opening of valve 56 is feedback-regulated by unit 57 to keep ratio ($P_{Oair}/P_{comp}$) equal to a target value or setpoint, so that:

$$\beta=P_{Oair}/P_{gas}=(setpoint*P_{comp})/(const*(P_{comp}-\Delta p_{cc}))$$
$$=(setpoint/const)*(1/(1-\Delta p_{cc}/P_{comp}))=setpoint*(1/const)*(1/(1-\Delta p_{cc\%}))$$

where $\Delta p_{cc\%}$ indicates the percentage losses in the combustion chamber, and, varying little alongside variations in load P for a given burner, can be assumed substantially constant. The expansion ratio β of cooling circuit 55 is therefore roughly directly proportional to the target ratio ($P_{Oair}/P_{comp}$) value set by unit 57.

The cooling air reduced mass flow is related by a biunique function f(β) to expansion ratio β, so that unit 57, when setting the target value or setpoint, also indirectly sets a constant reduced mass flow.

Maintaining a constant expansion ratio β, and therefore a constant reduced mass flow, keeps cooling air mass flow proportional to the ratio between pressure $P_{Oair}$ and the cooling air temperature $T_{air}$ at the inlet of circuit 55, and therefore to the density of the air, which is directly related to the degree of pressurization, defined by pressure $P_{comp}$, in gas turbine 1.

More specifically, reduced mass flow equals:

$$\dot{m}_{air}^{reduced} = \frac{\dot{m}_{air}[kg/s] \cdot \sqrt{T_{air}}}{p_{0air}} = f(\beta)$$

Therefore:

$$\dot{m}_{air}[kg/s] = \frac{p_{0air}}{\sqrt{T_{air}}} \cdot f(\beta) = k \cdot \frac{p_{0air}}{\sqrt{T_{air}}} \cdot setpoint$$

As stated, there is a feedback control: if the actual ratio ($P_{Oair}/P_{comp}$) calculated from the pressures measured by sensors 58 and 59 is below the setpoint, unit 57 increases the opening of valve 56 to increase pressure $P_{Oair}$; conversely, if the actual ratio ($P_{Oair}/P_{comp}$) is above the setpoint, unit 57 reduces the opening of valve 56 to reduce pressure $P_{Oair}$.

Figure 3:
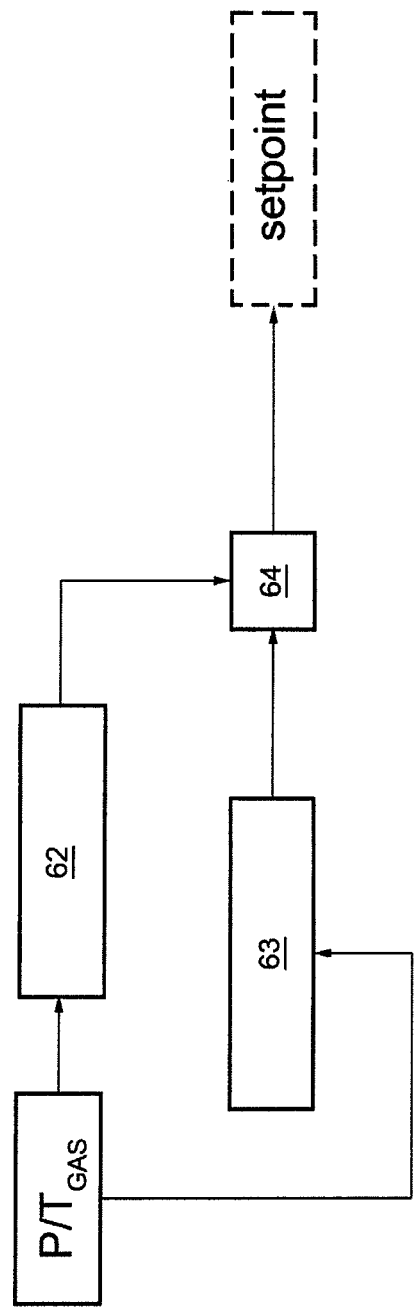
FIG. 3 shows a block diagram of some of the steps in the control method.

According to another aspect of the present invention, as shown in the FIG. 3 block diagram, the control strategy of unit 57 determines the setpoint as a function of load P. Alternatively, given the biunique function relating load P to temperature $T_{gas}$, the setpoint may also be determined as a function of $T_{gas}$.

The setpoint is predetermined:

to reduce the opening of valve 56, by reducing the setpoint, when load P is above a threshold value P1, so as to save cooling air and so increase combustion airflow to burner 3; increasing combustion air (with respect to the stoichiometric ratio) reduces the temperature in the combustion chamber, and therefore nitric oxide emissions;

to increase the opening of valve 56 at partial loads, i.e. when load P is below threshold value P1, by increasing the setpoint, so as to increase cooling airflow and reduce combustion airflow; reducing combustion airflow (with respect to the stoichiometric ratio) maintains a high temperature in the combustion chamber, and so reduces carbon monoxide emissions.

Figure 4:
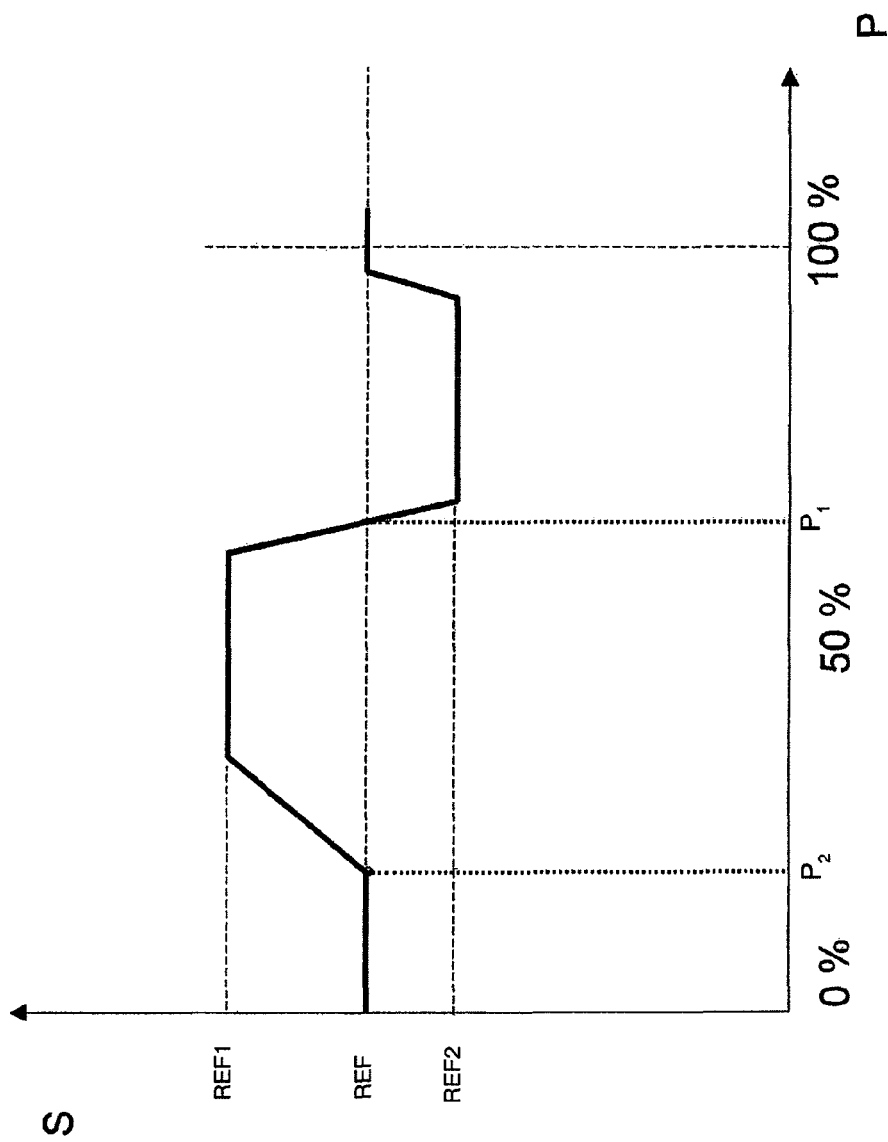
FIGS. 4 and 5 show graphs of respective steps in the control method.

The FIG. 4 graph shows a step performed, as a function of load P, in block 62 of the FIG. 3 strategy to determine a reference signal S (shown along the y axis). At relatively low loads P, i.e. below a threshold value P2, reference signal S remains equal to a nominal value REF determined at the design stage to achieve nominal cooling air mass flow and optimum performance in a given operating condition, e.g. with a turbine output of 95% nominal load.

When load P exceeds threshold value P2, reference signal S increases to, and for a time remains equal to, a value REF1. When load P reaches roughly threshold value P1, reference signal S falls to a value REF2 lower than value REF. More specifically, the difference between REF and REF2 is smaller than that between REF1 and REF. For a time, reference signal S remains equal to value REF2, and eventually increases to value REF just before turbine 4 reaches 100% nominal load.

As stated, unit 57 preferably also adjusts the opening of valve 56 on the basis of temperature $T_{airrot}$ to protect blades 24, 28. To establish the setpoint, unit 57 determines a correction factor F in a block 63, and applies correction factor F to reference signal S in a block 64. The correction factor F increases reference signal S to increase the opening of valve 56, when temperature $T_{airrot}$ exceeds a nominal design value $T_{ref}$, and reduces reference signal S to reduce the opening of valve 56 when temperature $T_{airrot}$ falls below value $T_{ref}$. The law by which block 63 determines correction factor F varies as a function of load P of turbine 4, and, taking into account the load losses in the cooling channels in blades 24, 28, and the thermal limits of the component parts, maintains an optimum expansion ratio β value in circuit 55.

Figure 5:
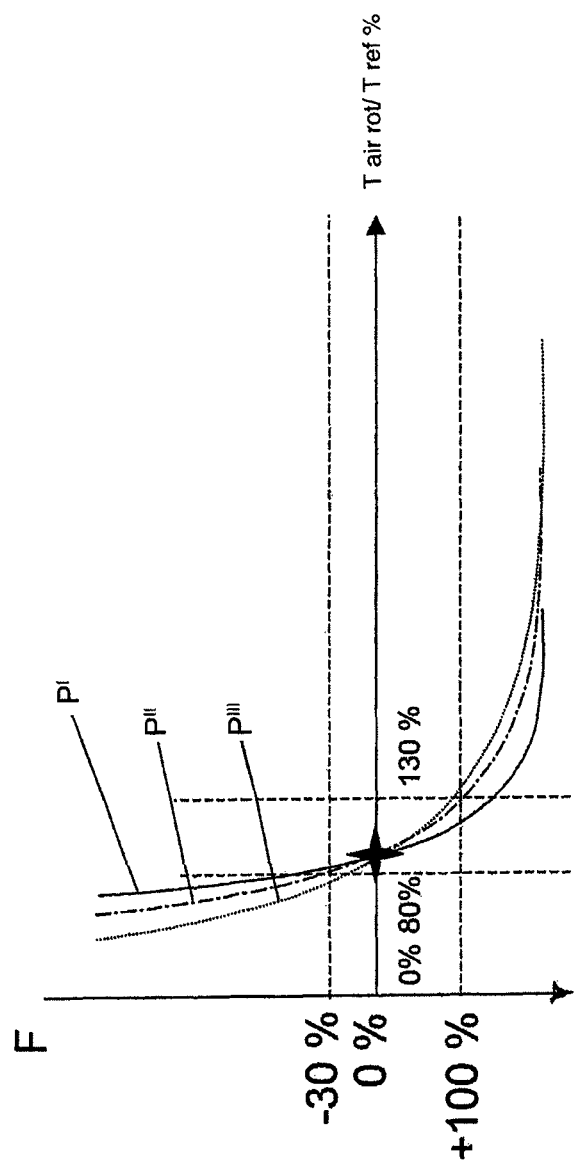

The FIG. 5 graph shows an example of how block 63 determines correction factor F. The graph shows correction factor F along the y axis; ratio $T_{airrot}/T_{ref}$, expressed as a percentage, along the x axis; and a number of curves, each associated with a respective load P', P'', P''' of turbine 4. By selecting the curve relative to the actual load P, and going to the point along the x axis corresponding to the measured temperature $T_{airrot}$, block 63 determines the corresponding point along the y axis, i.e. the correction factor F to apply to reference signal S to establish the setpoint.

Alternatively, to protect blades 24, 28, the control strategy could determine the correction factor to apply to reference S as a function of the estimated metal mean temperature of stator blades 28 and/or rotor blades 24, as opposed to temperature $T_{airrot}$. This is a more complicated control strategy, because of the blade metal temperature calculations involved, but is more accurate. More specifically, blade metal temperature is estimated using a 'hot' and 'cold' blade side exchange equation, which includes measurements of temperature $T_{gas}$ (considered proportional to the temperature of the gases contacting the blades), temperature $T_{air}$, and temperature $T_{airrot}$ the correction coefficients and heat exchange areas of the blades, and cooling airflow (calculated from expansion ratio β).

In normal operating conditions, the thermal load on blades 24, 28 is determined from the flow and temperature of the burnt gases in conduit 15 of turbine 4, and is roughly proportional to load P, in turn roughly proportional to the pressurization of gas turbine 1 defined by pressure $P_{comp}$. The control strategy maintains a constant expansion ratio β of circuit 55, for a given setpoint by unit 57, and operates so that cooling air reduced mass flow is constant, and cooling air mass flow therefore increases/decreases roughly in proportion to pressure $P_{comp}$ and therefore to the thermal load on blades 24, 28. This proportionality between external thermal load and cooling air mass flow ensures the temperature of the hot components (particularly blades 24, 28) remains around value $T_{ref}$.

In normal operating conditions, therefore, control strategy block 64 makes practically no correction to reference signal S.

In transient states (sharp changes in load P) and in the event of anomalies, however, the correction made by block 64 prevents hot parts from overheating.

As stated, the control strategy maintains an optimum expansion ratio β and therefore optimum cooling air mass flow in circuit 55 of stage 20; at the same time, also adjusts combustion airflow to reduce contaminating gas emissions in certain operating conditions, by varying the setpoint as a function of load P and/or temperature $T_{gas}$; and also performs a safety function by taking into account temperature $T_{airrot}$.

Moreover, the way in which stages 20 of turbine 4 are cooled is relatively simple from the design and construction standpoint, by virtue of rotor blades 24 being cooled by the same air flowing through stator blades 28.

Clearly, changes may be made to the control method described without, however, departing from the protective scope of the present invention as defined in the attached Claims.

In particular, a given relatively narrow range may be substituted for the target value or setpoint; and/or correction by block 64 may be eliminated.

What is claimed is:

1. A control method for cooling a turbine stage of a gas turbine, the method comprising:
   bleeding cooling air from combustion air flowing in a compressor of said gas turbine, and feeding the bled cooling air to a cooling circuit starting from a stator of said turbine stage; and
   regulating cooling airflow to said cooling circuit as a function of the pressure ($P_{Oair}$) at an inlet of said cooling circuit,
   wherein the cooling airflow is adjusted as a function of a combustion air pressure ($P_{comp}$) of said compressor, and
   wherein the cooling airflow is adjusted by feedback-controlling an opening of a valve as a function of a cooling air temperature ($T_{airrot}$) at an outlet of said stator.

2. The method as claimed in claim 1, wherein the cooling airflow is adjusted as a function of the combustion air pressure ($P_{comp}$) at an exhaust of said compressor.

3. The method as claimed in claim 1, wherein the cooling airflow is adjusted as a function of a ratio between the pressure ($P_{Oair}$) at the inlet of said cooling circuit, and the combustion air pressure ($P_{comp}$).

4. The method as claimed in claim 3, wherein the cooling airflow is adjusted by feedback-controlling the opening of the valve to achieve a predetermined target of said ratio.

5. The method as claimed in claim 4, wherein the predetermined target is a function of a parameter defined by a power output (P) of the turbine, or by a temperature ($T_{gas}$) of burnt gases at an exhaust of the turbine.

6. The method as claimed in claim 5, wherein said target is predetermined by setting a reference signal (S) to:
   a first value (REF) in a first range of said parameter;
   a second value (REF1), higher than the first value (REF), in a second range, following the first range, of said parameter; and
   a third value (REF2), lower than the first value (REF), in a third range, following the second range, of said parameter.

7. The method as claimed in claim 6, wherein a difference between the second and first value (REF1-REF) is greater than a difference between the first and third value (REF-REF2).

8. The method as claimed in claim 6, wherein said reference signal (S) equals the first value (REF) for a power output (P) equal to a nominal power output of the turbine.

9. The method as claimed in claim 6, wherein said target is predetermined by correcting said reference signal (S) as a function of the cooling air temperature ($T_{airrot}$) at the outlet of said stator.

10. The method as claimed in claim 9, wherein said correction is made as a function of a metal temperature of blades in said turbine stage, and said metal temperature being estimated as a function of the cooling air temperature ($T_{airrot}$) at the outlet of said stator, the gas temperature ($T_{gas}$) at the exhaust of the turbine, and a cooling air temperature ($T_{air}$) at the inlet of said cooling circuit.

11. The method as claimed in claim 9, wherein an amount of said correction is determined as a function of the power output of said turbine.

12. The method as claimed in claim 9, wherein the cooling air temperature ($T_{airrot}$) is measured in an inner ring of said stator.

13. The method as claimed in claim 1, wherein said cooling circuit comprises a first and second portion arranged in succession and formed in said stator and in a rotor of said turbine stage respectively.

14. The method as claimed in claim 1, wherein the pressure ($P_{Oair}$) at the inlet of said cooling circuit is measured in an annular conduit formed in an outer annular structure of said stator.

15. A control method for cooling a turbine stage of a gas turbine, the method comprising:
   bleeding cooling air from combustion air flowing in a compressor of said gas turbine, and feeding the bled cooling air to a cooling circuit starting from a stator of said turbine stage; and
   regulating cooling airflow to said cooling circuit as a function of the pressure ($P_{Oair}$) at an inlet of said cooling circuit,
   wherein the cooling airflow is adjusted as a function of a combustion air pressure ($P_{comp}$) of said compressor,
   wherein the cooling airflow is adjusted as a function of a ratio between the pressure ($P_{Oair}$) at the inlet of said cooling circuit, and the combustion air pressure ($P_{comp}$),
   wherein the cooling airflow is adjusted by feedback-controlling the opening of the valve to achieve a predetermined target of said ratio,
   wherein the predetermined target is a function of a parameter defined by a power output (P) of the turbine, or by a temperature ($T_{gas}$) of burnt gases at an exhaust of the turbine, and
   wherein said target is predetermined by setting a reference signal (S) to:
      a first value (REF) in a first range of said parameter;
      a second value (REF1), higher than the first value (REF), in a second range, following the first range, of said parameter; and
      a third value (REF2), lower than the first value (REF), in a third range, following the second range, of said parameter.

16. The method as claimed in claim 15, wherein said correction is made as a function of a metal temperature of blades in said turbine stage, and said metal temperature being estimated as a function of the cooling air temperature ($T_{airrot}$) at the outlet of said stator, the gas temperature ($T_{gas}$) at the exhaust of the turbine, and a cooling air temperature ($T_{air}$) at the inlet of said cooling circuit.

17. The method as claimed in claim 15, wherein an amount of said correction is determined as a function of the power output of said turbine.

18. The method as claimed in claim 15, wherein the cooling air temperature ($T_{airrot}$) is measured in an inner ring of said stator.

19. A control method for cooling a turbine stage of a gas turbine, the method comprising:
   bleeding cooling air from combustion air flowing in a compressor of said gas turbine, and feeding the bled cooling air to a cooling circuit starting from a stator of said turbine stage; and
   regulating cooling airflow to said cooling circuit as a function of the pressure ($P_{Oair}$) at an inlet of said cooling circuit,
   wherein the cooling airflow is adjusted as a function of a combustion air pressure ($P_{comp}$) of said compressor, and
   wherein said cooling circuit comprises a first and second portion arranged in succession and formed in said stator and in a rotor of said turbine stage respectively.

20. A control method for cooling a turbine stage of a gas turbine, the method comprising:
   bleeding cooling air from combustion air flowing in a compressor of said gas turbine, and feeding the bled cooling air to a cooling circuit starting from a stator of said turbine stage; and
   regulating cooling airflow to said cooling circuit as a function of the pressure ($P_{Oair}$) at an inlet of said cooling circuit,
   wherein the cooling airflow is adjusted as a function of a combustion air pressure ($P_{comp}$) of said compressor, and
   wherein the pressure ($P_{Oair}$) at the inlet of said cooling circuit is measured in an annular conduit formed in an outer annular structure of said stator.

* * * * *